United States Patent
Byun et al.

(10) Patent No.: US 9,213,549 B2
(45) Date of Patent: Dec. 15, 2015

(54) APPARATUS FOR PROCESSING REGISTER WINDOW OVERFLOW AND UNDERFLOW

(75) Inventors: Kyung Jin Byun, Daejeon (KR); Nak Woong Eum, Daejeon (KR); Hee-Bum Jung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 458 days.

(21) Appl. No.: 13/564,325

(22) Filed: Aug. 1, 2012

(65) Prior Publication Data

US 2013/0166810 A1    Jun. 27, 2013

(30) Foreign Application Priority Data

Dec. 27, 2011 (KR) ................ 10-2011-0143969

(51) Int. Cl.
| | | |
|---|---|---|
| G06F 9/00 | (2006.01) | |
| G06F 11/36 | (2006.01) | |
| G06F 12/06 | (2006.01) | |
| G06F 9/30 | (2006.01) | |

(52) U.S. Cl.
CPC ............ *G06F 9/30127* (2013.01); *G06F 11/36* (2013.01); *G06F 12/06* (2013.01)

(58) Field of Classification Search
CPC ........... G06F 11/36; G06F 12/00; G06F 9/00; G06F 12/06
USPC ......................................................... 710/105
See application file for complete search history.

(56) References Cited

U.S. PATENT DOCUMENTS

| | | | | | |
|---|---|---|---|---|---|
| 5,233,691 | A | * | 8/1993 | Ando et al. ..................... | 710/52 |
| 5,721,868 | A | * | 2/1998 | Yung et al. ..................... | 711/149 |
| 5,987,259 | A | * | 11/1999 | Goebel ........................ | 717/152 |
| 6,131,188 | A | * | 10/2000 | Goebel ........................ | 717/141 |
| 6,219,783 | B1 | * | 4/2001 | Zahir et al. .................... | 712/228 |
| 7,334,112 | B2 | * | 2/2008 | Zahir et al. .................... | 712/220 |
| 7,661,112 | B2 | * | 2/2010 | Nemirovsky et al. ......... | 719/318 |
| 7,877,481 | B2 | * | 1/2011 | Musoll et al. ................. | 709/226 |
| 7,962,731 | B2 | * | 6/2011 | Rychlik ........................ | 712/228 |

(Continued)

FOREIGN PATENT DOCUMENTS

KR    10-0508584 B1    8/2005

OTHER PUBLICATIONS

Eduardo Quiñones et al., "Leveraging Register Windows to Reduce Physical Registers to the Bare Minimum", IEEE Transactions on Computers, Dec. 2012, pp. 1598-1610, vol. 59, No. 12.

*Primary Examiner* — Tim T Vo
*Assistant Examiner* — Christopher A Daley
(74) *Attorney, Agent, or Firm* — Rabin & Berdo, P.C.

(57) ABSTRACT

An apparatus for processing a register window overflow and underflow includes register windows each configured to include local registers and incoming registers, dedicated internal memories configured to store contents of the local registers and the incoming registers for each word, dedicated data buses configured to connect the local registers and the incoming registers and the respective dedicated internal memories, a memory word counter configured to perform counting in order to determine whether or not there is a storage space of a word unit in the dedicated internal memories, and a logic block configured to control an operation of the dedicated data buses when one of a window overflow and a window underflow is generated based on the count value of the memory word counter.

8 Claims, 3 Drawing Sheets

(56) References Cited

U.S. PATENT DOCUMENTS

| | | | |
|---|---|---|---|
| 7,971,041 B2 * | 6/2011 | Ramsey | 712/228 |
| 2008/0046697 A1 * | 2/2008 | Sugure et al. | 712/218 |
| 2011/0128810 A1 * | 6/2011 | Sato | 365/230.06 |

* cited by examiner

FIG. 2

```
procedure_a:                    //  CWR=2
    set   0x1, %out0            //  (1)
    set   0x2, %out1
    set   0x3, %out2
    call  procedure_b           //  (2) sub_function call
    nop
    st    %out0,[%g1]           //  (3)
    ret procedure_b:                    //  (4) CWR=1
    ...
    ...
    add   %g0, %in0, %g2        //  (5)
    add   %g2, %in1, %g2
    add   %g2, %in2, %g2
    ...
    mov   %g2, %in0             //  (6) save the return value in in0
    ret
```

APPARATUS FOR PROCESSING REGISTER WINDOW OVERFLOW AND UNDERFLOW

CROSS-REFERENCES TO RELATED APPLICATIONS

The present application claims priority under 35 U.S.C 119(a) to Korean Application No. 10-2011-0143969, filed on Dec. 27, 2011, in the Korean Intellectual Property Office, which is incorporated herein by reference in its entirety set forth in full.

BACKGROUND

An exemplary embodiment of the present invention relates to an apparatus for processing a register window overflow and underflow, and more particularly, to an apparatus for processing a register window overflow and underflow which processes a window overflow or a window underflow or both in a Reduced Instruction Set Computer (RISC) processor having a register window structure.

An amount of digital signal processing is indispensable in smart phones and digital multimedia devices which are recently being used a lot. In order to efficiently process a large number of operations, most of devices adopt a processor in an embedded form. Furthermore, there is an increasing demand for the processor of an embedded form because the functions of not only up-to-date high-tech devices, but also lots of household electric appliances being used in daily life become various and complicated.

However, a computational load to be processed is gradually increasing because the complexity of algorithms in applied fields is increasing, and thus a high-performance processor having a very high operating frequency and an RISC structure is mounted on the above-described devices. Accordingly, the use of the high-performance processor is increasing. In general, processors having the RISC structure enable a high operating frequency to be designed because they are characterized in a register-based operation and a simple instruction set.

The RISC processor has a computer structure in which all instructions other than instructions, such as LOAD and STORE for memory access, use registers as operands in order to perform a program at a high speed. In addition, the RISC processor is characterized in that a unified instruction structure, a small number of instruction sets, a high-speed pipeline structure, and a register window.

From among them, a register window is a set of overlapping registers and is configured in a window form. The register window consists of a set of local registers, incoming registers, outgoing registers, and global registers. When a program is executed, one procedure may use a set of registers on one specific window in a register window and has a set of global registers which may be jointly used by all the procedures of the program.

An advantage of this register window structure is that a call to a procedure may be rapidly performed. If a procedure is called when a program is executed, a parameter may be transferred by only changing a window without the need to newly perform memory access because the caller parameter part of a register window now being used and the callee parameter part of a newly allocated register window are identical with each other. Accordingly, the program can be rapidly executed.

In an RISC processor having a register window structure, the size of a register window is selected from among 2 to 32 by taking performance and hardware complexity into consideration. If the number of register windows is increased as described above, there is an advantage in that a program may be rapidly executed, but there is a disadvantage in that hardware complexity is increased because the number of registers forming a register window is increased. For this reason, the number of register windows is commonly 2 to 8.

If more procedures than register windows are called, a window overflow is generated, with the result that the transfer of a parameter using a window is made impossible. In this case, a processor has to generate a trap, and a window value has to be adjusted and register values have to be stored by a trap service routine. Consequently, a program cannot be rapidly executed as described above because a loss of cycles is increased.

U.S. Pat. No. 5,233,691 discloses a method of improving the ability to store a register window in a current procedure because a register window used in a procedure called in the past before an overflow is generated in a register file has already been stored at a point of time at which the overflow is generated by previously storing the registers of the past register window in stack memory using an external bus in an RISC processor having a register file. However, the method of the U.S. patent differs from a method of rapidly executing a program without a loss of cycles.

Furthermore, Korean Patent Laid-Open Publication No. 1999-0075766 discloses a method of reducing the mean time that it takes to process an interrupt by selecting, storing, and restoring only registers requiring storage and restoration when an interrupt is generated in an RISC type processor having a large number of registers. This Korean patent attempts to reduce the mean interrupt processing time by storing and restoring only values of V-registers that need to be stored in such a manner that only V-registers having changed values are selected when an interrupt is generated, the values of the selected V-registers are stored in memory, a value of a special register informing whether a write operation has been performed on the V-registers or not is stored in the memory, a relevant task is performed by calling a function, the stored value of the special register is restored, and only values of V-registers stored based on the restored value of the special register are selected and restored, without storing and restoring the values of all V-registers when an interrupt is generated in an RISC type processor. This method relates to a method of rapidly processing an interrupt by selectively storing and restoring registers using a known RISC processor, but differs from a method of rapidly executing a program without a loss of cycles.

The background of the present invention is disclosed in Korean Patent Laid-Open Publication No. 10-1999-0075766 (Oct. 15, 1999).

SUMMARY

An embodiment of the present invention relates to an apparatus for processing a register window overflow and underflow, which may improve a processor's ability to execute a program and rapidly execute a program without a loss of cycles by processing an overflow and/or an underflow in hardware when the overflow and/or the underflow are generated in an RISC processor having a register window structure.

In one embodiment, an apparatus for processing a register window overflow and underflow includes register windows each configured to include local registers and incoming registers; dedicated internal memories configured to store the contents of the local registers and the incoming registers for each word; dedicated data buses configured to connect the local registers and the incoming registers and the respective dedicated internal memories; a memory word counter configured to perform counting in order to determine whether or not there is a storage space of a word unit in the dedicated internal memories; and a logic block configured to control an operation of the dedicated data buses when one of a window overflow and a window underflow is generated based on the count value of the memory word counter.

In the present invention, if a word value of the dedicated internal memory is N (a natural number), the count value of the memory word counter is set to N. The count value of the memory word counter is decreased by 1 whenever the window overflow is generated, and the contents of the local registers and the incoming registers included in the register window corresponding to a current window value are stored in the dedicated internal memories until the count value of the memory word counter becomes 0.

In the present invention, if the count value is increased by 1 whenever the window underflow is generated and thus the count value becomes greater than 0, the contents stored in the dedicated internal memories are restored to the local registers and the incoming registers of the register window corresponding to the current window value.

The dedicated internal memories of the present invention are divided into first memory for storing the contents of the local registers and second memory for storing the contents of the incoming registers.

The logic block of the present invention includes a first AND gate configured to receive a window overflow generation signal and the count value; a first inverter configured to invert the output of the first AND gate; a second AND gate configured to receive a window underflow generation signal and the count value; a second inverter configured to invert the output of the second AND gate; and multiplexers configured to receive output signals of the first inverter and the second inverter, to have respective output terminals connected to the dedicated data buses, and to control the operation of the dedicated data buses.

In the present invention, the apparatus further includes a modulo operator configured to change a value of a current window through a modulo operation when a new procedure is called or a called procedure is returned if a number of the register windows is an NWIN (a natural number of 2 or more).

In the present invention, if a word value of the dedicated internal memory is N (a natural number), the apparatus is able to call (NWIN+N) procedures without generating a window overflow trap.

In the present invention, each of the number of bits of the local registers and the number of bits of the incoming registers is equal to or smaller than the bus width of the dedicated data bus.

In the present invention, the contents of the local registers and the contents of the incoming registers are stored in the dedicated internal memories in one cycle.

BRIEF DESCRIPTION OF THE DRAWINGS

The above and other aspects, features and other advantages will be more clearly understood from the following detailed description taken in conjunction with the accompanying drawings, in which:

FIG. 2 is a diagram showing an example of a procedure illustrating a method of transferring parameters according to the switching of a register window.

DESCRIPTION OF SPECIFIC EMBODIMENT

Figure 1:
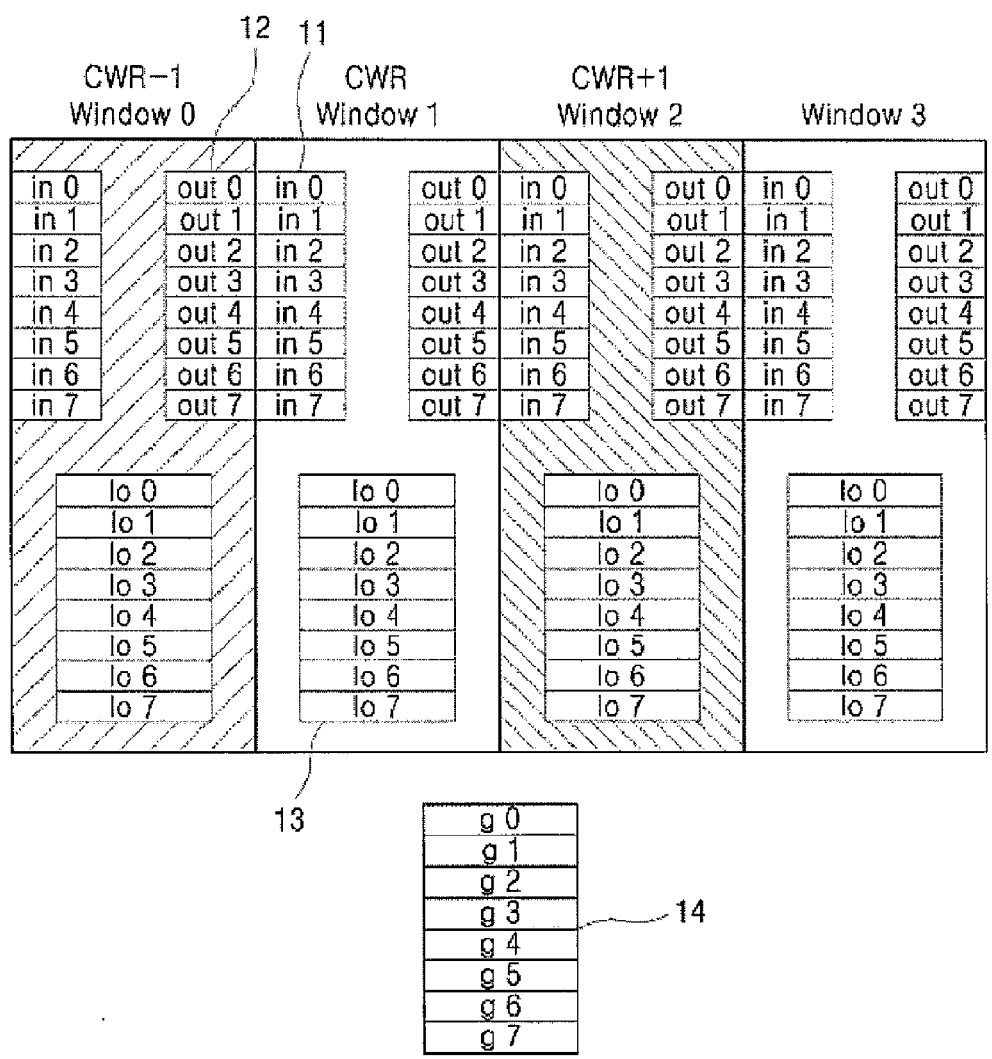
FIG. 1 is a diagram showing the structure of a register window in a known RISC processor configured to include register windows.

Hereinafter, an apparatus for processing a register window overflow/underflow according to an embodiment of the present invention will be described with reference to accompanying drawings. In the specification, the thickness of lines or the size of elements shown in the drawings may be enlarged for the clarity of a description and for the sake of convenience. Furthermore, terms to be described later are defined by taking functions in the present invention into consideration and may be different according to an operator's intention or usages. Accordingly, the terms should be defined based on the contents over the entire specification.

The present invention relates to an apparatus, that is, a hardware scheme, capable of reducing the number of cycles for processing an overflow and/or an underflow when the overflow and/or the underflow are generated in a register window in a processor configured to have register windows, from among RISC processors.

In a processor configured to have register windows, when an overflow and/or an underflow are generated in a register window, in general, a trap is generated and the generated overflow and/or underflow is processed in software. This software processing, however, is disadvantageous in that a loss of unnecessary cycles is increased when a window overflow and/or underflow continue to be generated in a program including frequent subroutine calls because the software processing requires lots of cycles.

In order to solve the problem, the apparatus for processing a register window overflow and underflow according to an embodiment of the present invention includes a hardware scheme, including dedicated memory for storing a register file, a modulo operator, and a simple logic block, which may process an overflow and/or an underflow without a loss of cycles when the overflow and/or the underflow are generated in a register window.

First, the structure and operation of a register window in a known RISC processor configured to include register windows are described below.

FIG. 1 is a diagram showing the structure of the register window in the known RISC processor configured to include register windows, and FIG. 2 is a diagram showing an example of a procedure illustrating a method of transferring parameters according to the switching of a register window.

FIG. 1 shows the structure of the existing register window and illustrates an example in which the number of windows is 4.

The register window includes register sets. The register sets include eight local registers 13, eight incoming registers 11, and eight outgoing registers 12 for each window and further includes global registers 14 not belong to a specific window.

A value of a current window is stored in a Current Window Register (CWR), and an example in which a value of the current window is 1 is illustrated in FIG. 1. The incoming registers 11 in CWR=1 are the same registers as the outgoing registers 12 in CWR=0, that is, a previous window. Furthermore, each of the windows includes a set of the local registers 13, and the global registers 14 are jointly used in all procedures.

In each of the windows, the outgoing registers 12 are the same registers as the incoming registers 11 in a next window, and consequently, the number of registers in one window is 16 (=8×2).

If the number of windows is 4 as illustrated in FIG. 1, the total number of registers is 72 (=(8×2)×4+8(global registers)). In this case, when the number of register windows is increased by 1, 16 registers will be increased. If the number of windows is 8, the total number of registers is greatly increased to 136, thereby increasing hardware complexity.

The switching of this register window is performed by a CWR. If parameter values to be handed over to a callee are set in the outgoing registers of a register window now being used by a caller when a program is executed, the callee may reduce a value of a CWR by 1 and then use the values set in the incoming registers of the register window without change, thus receiving the parameter values.

This switching is described below with reference to FIG. 2.

If a window allocated to a procedure a procedure_a is 2 (CWR=2), the procedure a uses local registers, incoming registers, and outgoing registers in the window 2. Furthermore, if parameters are transferred (1) through the outgoing registers of the window 2 when a procedure b procedure_b is called (2), the procedure b uses the window 1 (4). The procedure b may directly use the transferred parameter (5) because the incoming registers in the window 1 are the same as the outgoing registers in the window 2. Furthermore, like in when the procedure b is returned, when a value to be returned is transferred through an incoming register in0 (6), the procedure a may directly receive an outgoing register out0 (3).

That is, since outgoing registers are identical with incoming registers in windows neighboring each other, parameters can be transferred by changing only a window without additional memory access. Accordingly, a program can be rapidly executed.

A procedure call may become efficient using a register window as described above, but a window overflow is generated if more procedures than register windows are called because the number of windows cannot be unlimitedly increased. In order to process the window overflow, a processor has to generate a trap, and a value of a window has to be adjusted and the register values of the window have to be stored according to a trap service routine. When a trap is generated, the registers of a window being used by the oldest procedure in a trap service routine are stored in memory, and the stored registers of the window may be allocated to a new procedure and then used. However, since the call of a procedure through this trap service routine requires lots of cycle losses, a window overflow in a place where the depth of a loop is deep may have an adverse effect on a system, such as that the execution speed of a program is very low.

Furthermore, if procedures exceeding the number of windows are generated and thus a window overflow is generated, a window underflow is generated when called functions are returned. Even in the case of the window underflow, a loss of cycles is generated because the window underflow has to be processed by a trap service routine as described above. In general, about 30 to 40 cycles are consumed in processing using the trap service routine.

The present invention provides an apparatus having a hardware scheme capable of processing a window overflow and/or a window underflow so that a program can be rapidly executed without a loss of cycles when the window overflow and/or the window underflow are generated.

Figure 3:
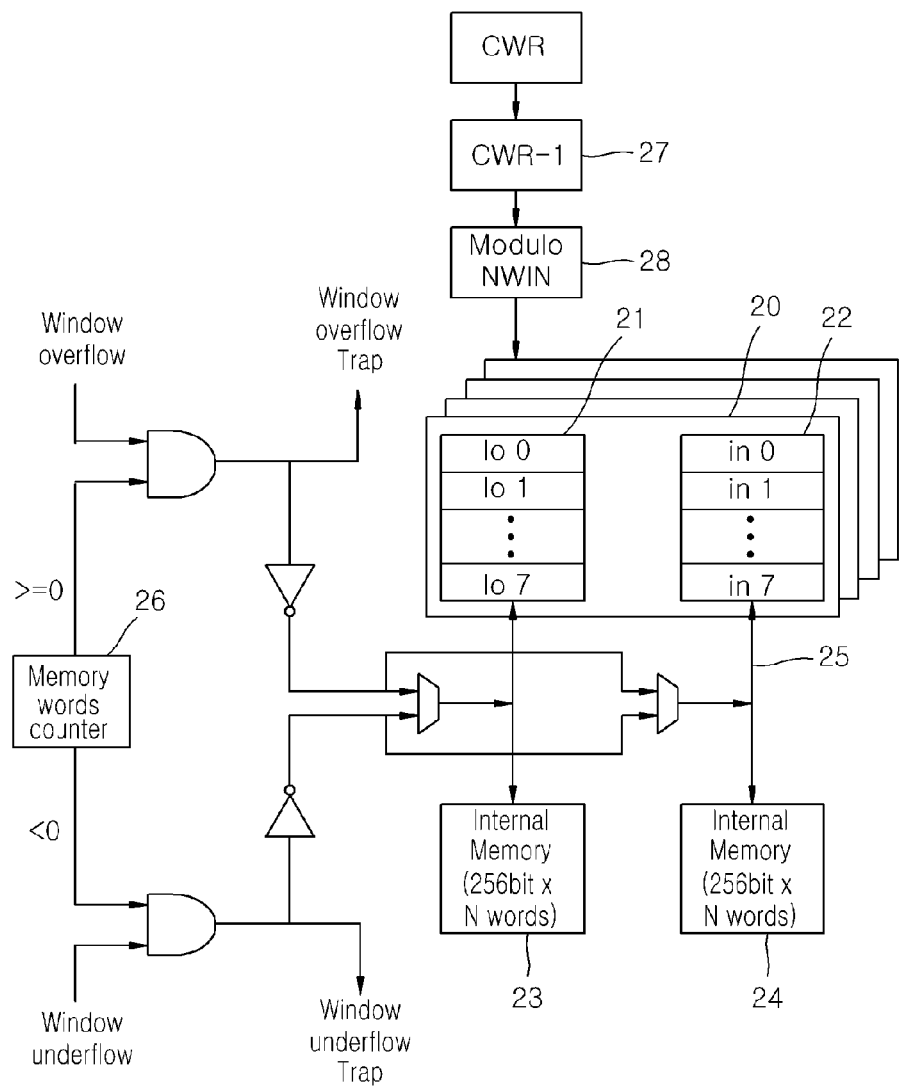
FIG. 3 shows the structure of an apparatus for processing a register window overflow and underflow according to an embodiment of the present invention.

FIG. 3 shows the structure of an apparatus for processing a register window overflow and underflow according to an embodiment of the present invention.

Register windows 20, local registers 21, incoming registers 22, dedicated internal memories 23 and 24, dedicated data buses 25, and a memory word counter 26 are shown in FIG. 3.

The apparatus for processing a register window overflow and underflow according to the embodiment of the present invention includes the register windows 20, the dedicated internal memories 23 and 24, the dedicated data buses 25, and the memory word counter 26.

Each of the register windows 20 includes the local register 21 and the incoming register 22, that is, a register file. The dedicated internal memories 23 and 24 may store the contents of the register file (i.e., the local registers 21 and the incoming registers 22) included in each of the register windows 20. The register files and the dedicated internal memories 23 and 24 are coupled through the dedicated data buses 25.

The memory word counter 26 may determine whether or not there is a space where the contents of the register files will be stored in the dedicated internal memories 23 and 24.

The number of bits of all the registers is hereinafter assumed to be 32 bits, but this is for easy understanding and convenience of the present invention and is not intended to limit the scope of the present invention.

The dedicated internal memory 23 for storing the contents of the local registers 21 and the dedicated internal memory 24 for storing the contents of the incoming registers 22 are separated from each other and are capable of storing the contents of the registers independently.

Each of the dedicated internal memories 23 and 24 consists of 256 bits×N words. Each of the dedicated data buses 25 has a bus width of 256 bits. Accordingly, eight local registers 21 each having 32 bits and eight incoming registers 22 each having 32 bits may be stored in the dedicated internal memories 23 and 24, respectively, each having 256 bits in one cycle.

The memory word counter 26 is reset to N, that is, the word value of each of the dedicated internal memories 23 and 24. Whenever a window overflow is generated, the N value of the memory word counter 26 is decreased by 1. When the value of the memory word counter 26 becomes 0, it means that there is no longer space where the contents of the register files will be stored in the dedicated internal memories 23 and 24. In this case, as in the prior art, a trap is generated, and a window overflow is generated according to a trap service routine.

Referring to FIG. 3, the number of register windows 20 is illustrated as being NWIN, and the number of words of each of the dedicated internal memories 23 and 24 is illustrated as being N. When a new procedure is called in a program, a CWR becomes CWR-1 (27). In contrast, when the procedure is returned, the CWR becomes CWR+1. Furthermore, this operation is performed by a modulo operator 28. In the modulo operator 28, a division is NWIN, that is, the number of register windows 20.

In a known register window, when the number of procedures called in a program is NWIN-1, it means that there are no longer register resources to be used in a new procedure. Accordingly, a window overflow is generated, and a window overflow is processed according to a trap service routine.

In an embodiment of the present invention, however, a trap is not generated although a window overflow is generated, but the memory word counter 26 is checked by using a simple logic block. If, as a result of the check, a value of the memory word counter 26 is greater than 0, values of a register file of the register window 20 indicating a CWR are stored in the dedicated internal memories 23 and 24. Furthermore, a new procedure receives the register files of the register windows 20 allocated and indicated by a value of the CWR. Accordingly, although the number of windows is NWIN, the calls of procedures more than N, that is, the number of words of the dedicated internal memories, can be efficiently processed without a loss of cycles.

For example, whether a window overflow trap has been generated or not may be determined depending on the output of an AND gate using a window overflow generation signal Window overflow and a value of the memory word counter 26 as input. Furthermore, if a window overflow trap is not generated, the output signal of the AND gate is inverted by an inverter and then inputted to a plurality of multiplexers MUX for controlling the operation of the dedicated data buses 25 so that the contents of the local register 21 and the incoming register 22 of a relevant register window 20 are transferred to the dedicated internal memories 23 and 24 through the respective dedicated data buses 25.

Even in the case of a window underflow, whether a window underflow trap has been generated or not is determined based on a window underflow generation signal Window underflow and a value of the memory word counter 26 by using a simple logic block, including an AND gate, an inverter, and the plurality of multiplexers. The contents of the dedicated internal memories 23 and 24 are transferred to the local register 21 and the incoming register 22 of a relevant register window 20 through the dedicated data buses 25.

This method is advantageous in that it may have the same performance as a method of increasing the number of register windows by using very low hardware costs. This is because a register has greater hardware complexity than memory.

This is described below when NWIN=4 and N=3.

TABLE 1

| PROCE-DURE | CWR (WIN-DOW) | MEMORY (COUNTER) | DESCRIPTION |
| --- | --- | --- | --- |
| MAIN | 0 | 3 | Use relevant window register file |
| A | 3 | 3 | Use relevant window register file |
| B | 2 | 3 | Use relevant window register file |
| C | 1 | 3->2 | When a window overflow is generated, the register files of a window 0 are stored. |
| D | 0 | 2->1 | When a window overflow is generated, the register files of a window 3 are stored. |
| E | 3 | 1->0 | When a window overflow is generated, the register files of a window 2 are stored. |
| F | 2 | 0 | When a window overflow trap is generated, the register files of a window 1 are stored. |
| G | 1 | -1 | Leaf procedure |

Table 1 relates to an operation of calling a procedure.

If the number of register windows is 4 and the number of words of dedicated internal memory is 3, a window overflow is generated in the procedure B when the new procedure C is called because up to three procedures may be called. In this case, in the existing structure, an overflow trap is generated, the registers of a next register window are stored according to a trap service routine. As in the present invention, however, if the dedicated internal memory capable of storing the contents of the register file of a register window is included, the register files of the window 0 can be stored in the dedicated internal memory without generating a trap. If the number of memory words is 3, as in the present embodiment, a window overflow trap is actually generated because a value of the memory word counter 26 is decreased by 1 whenever a new procedure is generated and thus the value becomes 0.

TABLE 2

| PROCE-DURE | CWR (WIN-DOW) | MEMORY (COUNTER) | DESCRIPTION |
| --- | --- | --- | --- |
| G | 1 | -1 | Use relevant window register file |
| F | 2 | -1 | Use relevant window register file |
| E | 3 | -1 | Use relevant window register file |
| D | 0 | -1->0 | When a window underflow trap is generated, the register files of a window 1 are restored. |
| C | 1 | 0->1 | When a window underflow is generated, the register files of a window 2 are restored. |
| B | 2 | 1->2 | When a window underflow is generated, the register files of a window 3 are restored. |
| A | 3 | 2->3 | When a window underflow trap is generated, the register files of a window 0 are restored. |
| MAIN | 0 | 3 | Use relevant window register file |

Table 2 relates to an operation of a procedure returning.

Register files are restored in an opposite sequence to sequence in which the registers files are stored when a procedure returns. When the procedure D is returned as in Table 2, a window underflow is generated. At this time, if a value of the memory word counter 26 is smaller than 0, a window underflow trap is generated, and thus the register files of a relevant window is restored by a trap service routine.

If a value of the memory word counter 26 is greater than 0, a trap is not generated although a window underflow is generated, but the register files of a relevant register window are restored from the dedicated internal memories.

If this window overflow/underflow processing hardware scheme is applied to the design of a processor, register files having high hardware complexity may be less used and the ability to execute a program may be improved because lots of cycle losses occurring when a procedure call is frequently generated in a program are reduced.

In accordance with the present invention, in an RISC processor having a register window structure, an overflow and/or an underflow are processed in hardware when the overflow and/or the underflow are generated. Accordingly, a processor's ability to execute a program can be improved, and a program can be rapidly executed without a loss of cycles.

The embodiment of the present invention has been disclosed above for illustrative purposes. Those skilled in the art will appreciate that various modifications, additions and substitutions are possible, without departing from the scope and spirit of the invention as disclosed in the accompanying claims.

What is claimed is:

1. An apparatus for processing a register window overflow and underflow, comprising:
   register windows each configured to include local registers and incoming registers;
   dedicated internal memories configured to store contents of the local registers and the incoming registers for each word;
   dedicated data buses configured to connect the local registers and the incoming registers and the respective dedicated internal memories;
   a memory word counter configured to perform counting in order to determine whether or not there is a storage space of a word unit in the dedicated internal memories; and
   a logic block configured to control an operation of the dedicated data buses when one of a window overflow or a window underflow is generated based on a count value of the memory word counter;

wherein the logic block comprises:

a first AND gate configured to receive a window overflow generation signal and the count value;

a first inverter configured to invert an output of the first AND gate;

a second AND gate configured to receive a window underflow generation signal and the count value;

a second inverter configured to invert an output of the second AND gate; and multiplexers configured to receive output signals of the first inverter and the second inverter, to have respective output terminals connected to the dedicated data buses, and to control the operation of the dedicated data buses.

2. The apparatus of claim 1, wherein:

if a word value of the dedicated internal memory is N (a natural number), the count value of the memory word counter is set to N, and the count value of the memory word counter is decreased by 1 whenever the window overflow is generated, and contents of the local registers and the incoming registers included in the register window corresponding to a current window value are stored in the dedicated internal memories until the count value of the memory word counter becomes 0.

3. The apparatus of claim 2, wherein if the count value is increased by 1 whenever the window underflow is generated and thus the count value becomes greater than 0, the contents stored in the dedicated internal memories are restored to the local registers and the incoming registers of the register window corresponding to the current window value.

4. The apparatus of claim 1, wherein the dedicated internal memories are divided into first memory for storing the contents of the local registers and second memory for storing the contents of the incoming registers.

5. The apparatus of claim 1, further comprising a modulo operator configured to change a value of a current window through a modulo operation when a new procedure is called or a called procedure is returned if a number of the register windows is an NWIN (a natural number of 2 or more).

6. The apparatus of claim 5, wherein if a word value of the dedicated internal memory is N (a natural number), the apparatus is able to call (NWIN+N) procedures without generating a window overflow trap.

7. The apparatus of claim 1, wherein each of a number of bits of the local registers and a number of bits of the incoming registers is equal to or smaller than a bus width of the dedicated data bus.

8. The apparatus of claim 7, wherein the contents of the local registers and the contents of the incoming registers are stored in the dedicated internal memories in one cycle.

* * * * *